(12) United States Patent
Park

(10) Patent No.: US 12,027,768 B2
(45) Date of Patent: Jul. 2, 2024

(54) ANTENNA AND ELECTRONIC DEVICE COMPRISING SAME

(71) Applicant: Samsung Electronics Co., Ltd., Suwon-si (KR)

(72) Inventor: Sungchul Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 227 days.

(21) Appl. No.: 17/643,884

(22) Filed: Dec. 13, 2021

(65) Prior Publication Data

US 2022/0102869 A1 Mar. 31, 2022

Related U.S. Application Data

(63) Continuation of application No. PCT/KR2020/006697, filed on May 22, 2020.

(30) Foreign Application Priority Data

Jun. 13, 2019 (KR) ........................ 10-2019-0070126

(51) Int. Cl.
 *H01Q 17/00* (2006.01)
 *H01Q 1/24* (2006.01)

(52) U.S. Cl.
 CPC ........... *H01Q 17/004* (2013.01); *H01Q 1/243* (2013.01)

(58) Field of Classification Search
 CPC .... H01Q 17/004; H01Q 1/243; H01Q 17/001; H01Q 17/00; H01Q 1/38; H04B 1/40; H04M 1/02; H04M 1/0249; H04M 1/0277
 See application file for complete search history.

(56) References Cited

U.S. PATENT DOCUMENTS 7,408,500 B2   8/2008 Shinoda et al.
9,537,983 B2 * 1/2017 Lee ..................... H04M 1/7246
(Continued)

FOREIGN PATENT DOCUMENTS

JP  H-11281730 A   10/1999
KR  10-1339092 B1  12/2013
(Continued)

OTHER PUBLICATIONS

International Search Report and Written Opinion of the International Searching Authority in connection with International Application No. PCT/KR2020/006697 dated Sep. 1, 2020, 10 pages.
(Continued)

*Primary Examiner* — Seung H Lee

(57) ABSTRACT

According to various embodiments, an electronic device may comprise: a housing; an antenna structure disposed in an inner space of the housing, the antenna structure including a substrate having a first surface and a second surface oriented toward a direction opposite to the first surface, and at least one first antenna element disposed in a space between the first surface and the second surface and having a beam pattern formed toward a conductive part; an electric wave absorbing member disposed between the conductive part and the at least one first antenna element so as to be disposed in a path in which the beam pattern is formed; and a first wireless communication circuit disposed in the inner space of the housing and configured to transmit or receive a wireless signal of a first frequency band through the at least one first antenna element.

19 Claims, 13 Drawing Sheets

(56) References Cited

U.S. PATENT DOCUMENTS

| | | | |
|---|---|---|---|
| 9,813,532 | B2 | 11/2017 | Kim et al. |
| 9,972,892 | B2 | 5/2018 | Noori et al. |
| 10,680,324 | B2 | 6/2020 | Weinstein et al. |
| 11,228,120 | B2 * | 1/2022 | Song .................... H01Q 1/243 |
| 2017/0093455 | A1 | 3/2017 | Lee et al. |
| 2017/0207516 | A1 | 7/2017 | Koo et al. |
| 2017/0244818 | A1 | 8/2017 | Kim et al. |
| 2018/0035528 | A1 * | 2/2018 | Kim .................... H05K 9/0033 |
| 2018/0358686 | A1 | 12/2018 | Park |
| 2019/0165472 | A1 * | 5/2019 | Yun .................... H04B 1/3888 |
| 2020/0303808 | A1 | 9/2020 | Jeon et al. |
| 2020/0373647 | A1 | 11/2020 | Lee |

FOREIGN PATENT DOCUMENTS

| | | |
|---|---|---|
| KR | 101651904 B1 | 8/2016 |
| KR | 20170087334 A | 7/2017 |
| KR | 20170098400 A | 8/2017 |
| KR | 20180134528 A | 12/2018 |
| KR | 20190061798 A | 6/2019 |
| WO | 2019132448 A1 | 7/2019 |

OTHER PUBLICATIONS

Office Action dated Sep. 21, 2023, in connection with Korean Patent Application No. 10-2019-0070126, 7 pages.

* cited by examiner

ANTENNA AND ELECTRONIC DEVICE COMPRISING SAME

CROSS-REFERENCE TO RELATED APPLICATIONS

This application is a Bypass Continuation of International Application No. PCT/KR2020/006697, filed May 22, 2020, which claims priority to Korean Patent Application No. 10-2019-0070126, filed Jun. 13, 2019, the disclosures of which are herein incorporated by reference in their entirety.

BACKGROUND

1. Field

Various embodiments of the disclosure relate to an antenna and an electronic device including the same.

2. Description of Related Art

Electronic devices (for example, electronics device for communication) are widely used in daily life in line with development of wireless communication technologies, and use of contents resulting therefrom is increasing exponentially. Network capacities are gradually reaching limits as a result of such an abrupt increase in content use, and in order to satisfy wireless data traffic demands that have been increasing since commercialization of 4G ($4^{th}$ generation) communication systems, there has been research regarding a communication system (for example, 5G ($5^{th}$ generation), pre-5G communication system, or new radio (NR)) that transmits and/or receives signals by using a high-frequency (for example, mmWave) band (for example, 3 GHz-300 GHz band).

SUMMARY

Next-generation wireless communication technologies can transmit and receive signals by using frequencies in the range of 3 GHz-100 GHz, and there has been development regarding an efficient mounting structure for overcoming high free space loss inherent in frequency characteristics and improving antenna gain, and a new antenna structure corresponding thereto. The above-mentioned antenna structure may include an array-type antenna module having at least one antenna element (for example, at least one conductive pattern and/or at least one conductive patch) disposed at an interval. Such antenna elements may be disposed such that a beam pattern is formed in one direction inside the electronic device. The electronic device may include a side member including at least partially a conductive part in order to reinforce rigidity and to provide an aesthetic appearance.

However, if such a conductive part is positioned in a direction in which a beam pattern formed by at least one antenna element of the antenna structure described above is oriented, the conductive part may change and/or distort the radiation direction of the antenna structure to a direction different from the desired direction, and this may pose a problem of degraded antenna radiation performance.

Various embodiments of the disclosure may provide an antenna and an electronic device including the same.

Various embodiments may provide an antenna implemented such that, even if a conductive part is disposed in a direction in which a beam pattern is formed, radiation performance degradation can be prevented, and an electronic device including the same.

According to various embodiments, an electronic device may include a housing having an inner space, an antenna structure disposed in the inner space of the housing, the antenna structure including a substrate that includes a first surface and a second surface oriented in a direction opposite to the first surface, and at least one first antenna element disposed in a space between the first surface and the second surface and configured to form a beam pattern toward a conductive portion of the housing, a radio-wave absorption member disposed between the conductive portion and the at least one first antenna element in a path in which the beam pattern is formed, and a first wireless communication circuit disposed in the inner space and configured to transmit or receive a wireless signal in a first frequency band through the at least one first antenna element.

According to various embodiments of the disclosure, the direction of a beam pattern distorted by a conductive part may be corrected by at least one radio-wave absorption member and/or radio-wave induction member disposed between an antenna structure and the conductive part, thereby helping to improve radiation performance.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF DRAWINGS

In connection with the description of the drawings, same or similar reference numerals will be used to refer to same or similar elements.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
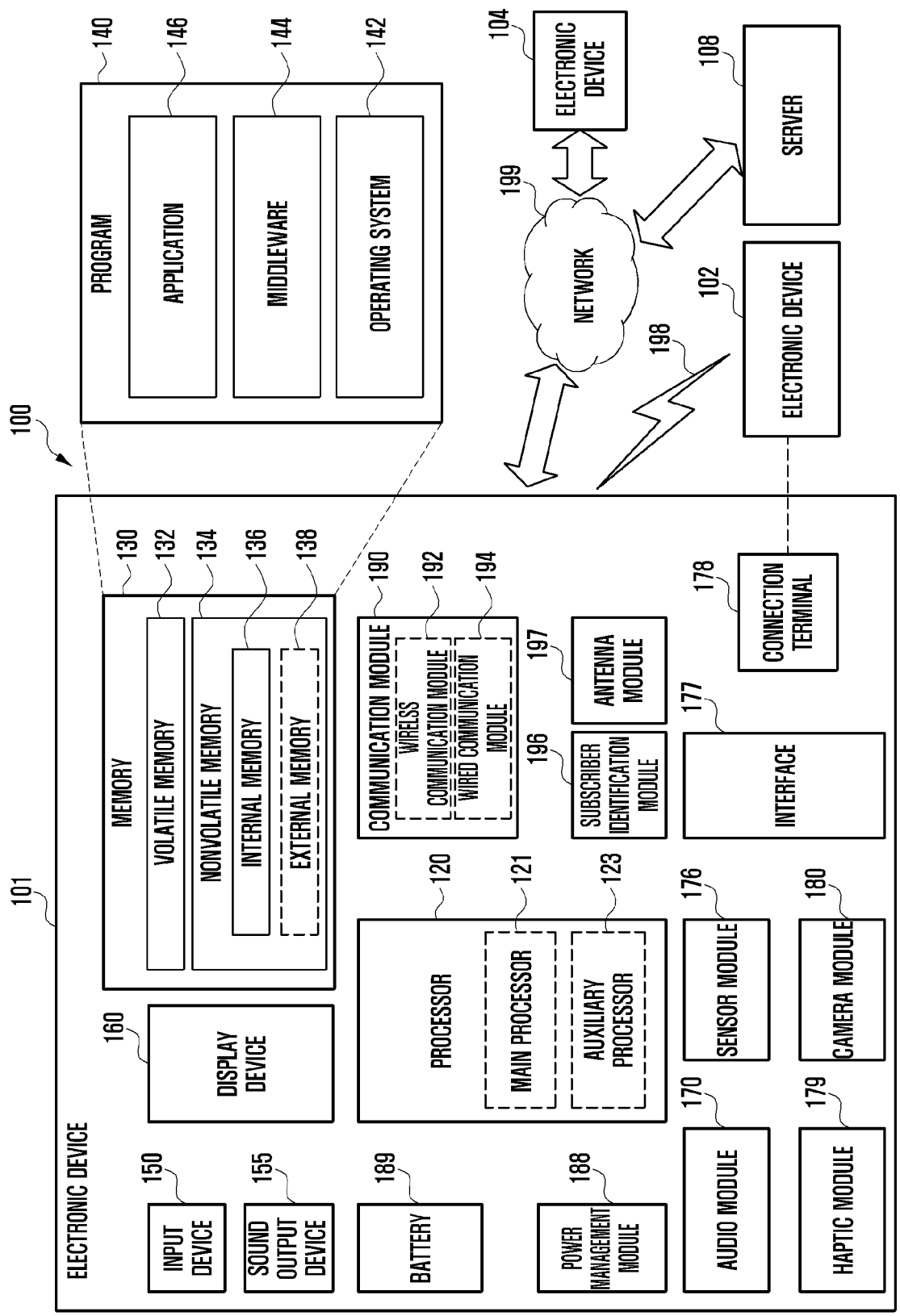
FIG. 1 is a block diagram of an electronic device in a network environment according to various embodiments of the disclosure.

FIG. 1 illustrates an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example.

The electronic device according to various embodiments disclosed herein can be one of various types of devices, such as, for example, and without limitation, portable communication devices (e.g., smartphones), computers, portable multimedia devices, portable medical instruments, cameras, wearable devices, home appliances, or the like. However, the electronic device is not limited to the above-mentioned devices.

It should be understood that the various example embodiments of the disclosure and the terminology used herein are not intended to limit the disclosure to specific embodiments but to include various modifications, equivalents, and/or alternatives thereof. In the drawings, the same or similar reference symbols are used to refer to the same or like parts. In the description, the singular forms "a", "an" and "the" are intended to include the plural forms as well, unless the context clearly indicates otherwise. In the description, the expression "A or B", "at least one of A and/or B", "A, B or C", or "at least one of A, B and/or C" may indicate all possible combinations of the listed items. The terms "first" and "second" may refer to various elements regardless of importance and/or order and are used to distinguish one element from another element without limitation. It will be understood that when an element (e.g., first element) is referred to as being (functionally or communicatively) "coupled with/to" or "connected with/to" another element (e.g., second element), it can be coupled or connected with/to the other element directly (e.g., wiredly), wirelessly, or via a third element.

In the description, the term "module" may refer to a certain unit that is implemented in hardware, software, firmware, or a combination thereof. The term "module" may be used interchangeably with the term "unit", "logic", "logical block", "component", or "circuit", for example. The module may be the minimum unit, or a part thereof, which performs one or more particular functions. For example, a module may be implemented in the form of an application-specific integrated circuit (ASIC).

Various embodiments of the disclosure may be implemented in software (e.g., the programs 140) including instructions stored in a machine-readable storage medium (e.g., internal memory 136 or external memory 138) readable by a machine (e.g., the electronic device 101). For example, the processor (e.g., the processor 120) of the machine (e.g., the electronic device 101) can fetch a stored instruction from a storage medium and execute the fetched instruction. When the instruction is executed by the processor, the machine may perform the function corresponding to the instruction. The instructions may include a code generated by a compiler and a code executable by an interpreter. The machine-readable storage medium may be provided in the form of a non-transitory storage medium. Here, the "non-transitory" storage medium may not include a signal and is tangible, but does not distinguish whether data is stored semi-permanently or temporarily in the storage medium.

The method according to various embodiments disclosed herein may be provided as a computer program product. A computer program product may be traded between a seller and a purchaser as a commodity. A computer program product may be distributed in the form of a machine-readable storage medium (e.g., compact disc read only memory (CD-ROM)) or be distributed online (e.g., download or upload) directly between two user devices (e.g. smartphones) through an application store (e.g., PlayStore™). For on-line distribution, at least a portion of the computer program product may be temporarily stored or temporarily created in a storage medium such as a memory of a manufacturer's server, an application store's server, or a relay server.

Each of the components (e.g., modules or programs) according to various embodiments described above may comprise one or more elements. An existing component may be omitted, and a new component may be added. Alternatively or additionally, some of the components (e.g., modules or programs) may be combined into one entity while maintaining the same functionality. Operations supported by a module, program, or another component may be carried out in sequence, in parallel, by repetition, or heuristically. Some operations may be executed in a different order or may be omitted, and a new operation may be added.

Figure 2:
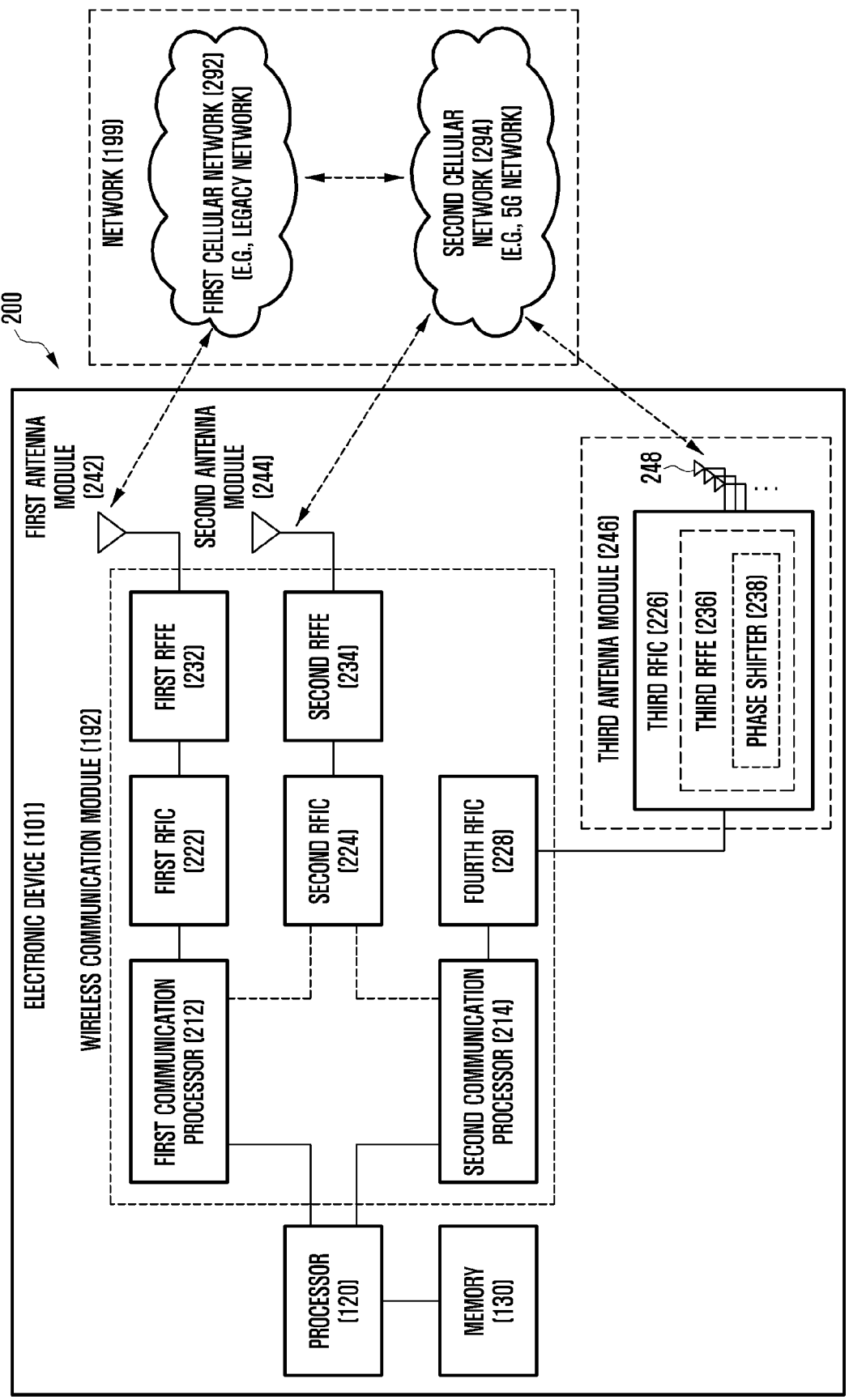
FIG. 2 is a block diagram of an electronic device for supporting a legacy network communication and 5G network communication according to various embodiments of the disclosure.

FIG. 2 is a block diagram illustrating an electronic device in a network environment including a plurality of cellular networks according to an embodiment of the disclosure.

Referring to FIG. 2, the electronic device 101 may include a first communication processor 212, second communication processor 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to another embodiment, the electronic device 101 may further include at least one of the components described with reference to FIG. 1, and the second network 199 may further include at least one other network. According to one embodiment, the first communication processor 212, second communication processor 214, first RFIC 222, second RFIC 224, fourth RFIC 228, first RFFE 232, and second RFFE 234 may form at least part of the wireless communication module 192. According to another embodiment, the fourth RFIC 228 may be omitted or included as part of the third RFIC 226.

The first communication processor 212 may establish a communication channel of a band to be used for wireless communication with the first cellular network 292 and support legacy network communication through the established communication channel. According to various embodiments, the first cellular network may be a legacy network including a second generation (2G), 3G, 4G, or long term evolution (LTE) network. The second communication processor 214 may establish a communication channel corresponding to a designated band (e.g., about 6 GHz to about 60 GHz) of bands to be used for wireless communication with the second cellular network 294, and support 5G network communication through the established communication channel. According to various embodiments, the second cellular network 294 may be a 5G network defined in 3GPP. Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to one embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to one embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to one embodiment, the first RFIC 222 and the second RFIC 224 may be implemented into at least part of a single package or a single chip. According to one embodiment, the first RFFE 232 and the second RFFE 234 may be implemented into at least part of a single package or a single chip. According to one embodiment, at least one of the first antenna module 242 or the second antenna module 244 may be omitted or may be combined with another antenna module to process RF signals of a corresponding plurality of bands.

According to one embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to one embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3A:
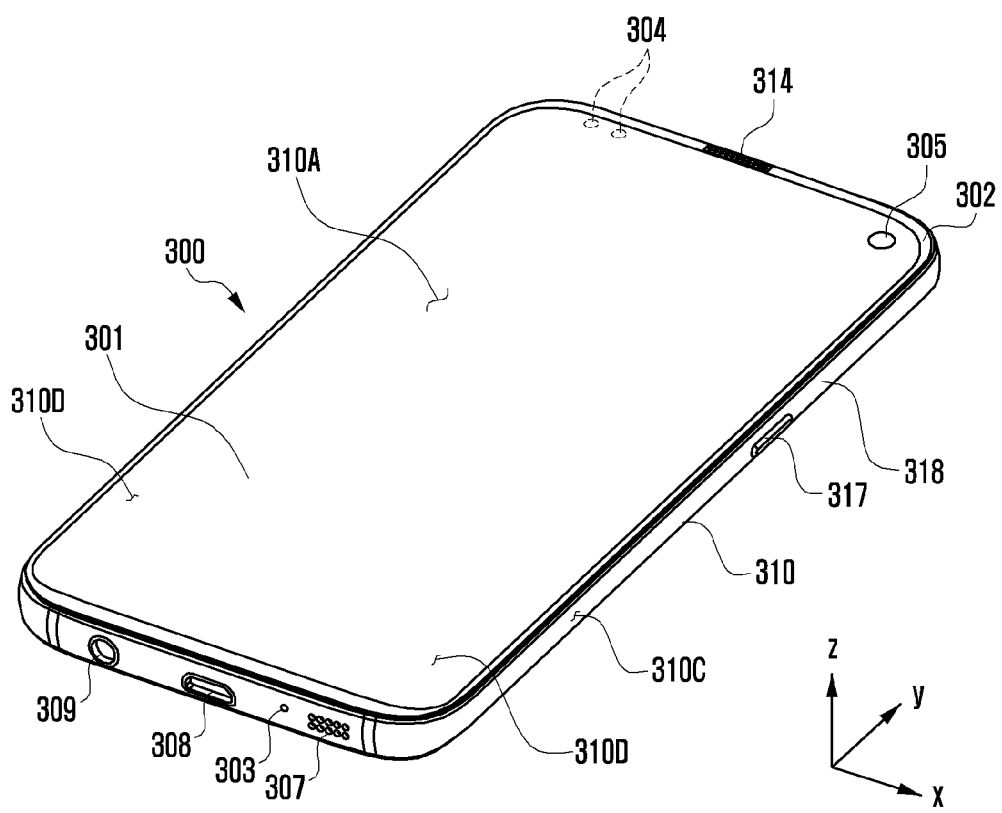
FIG. 3A is a perspective view of a mobile electronic device according to various embodiments of the disclosure.
Figure 3B:
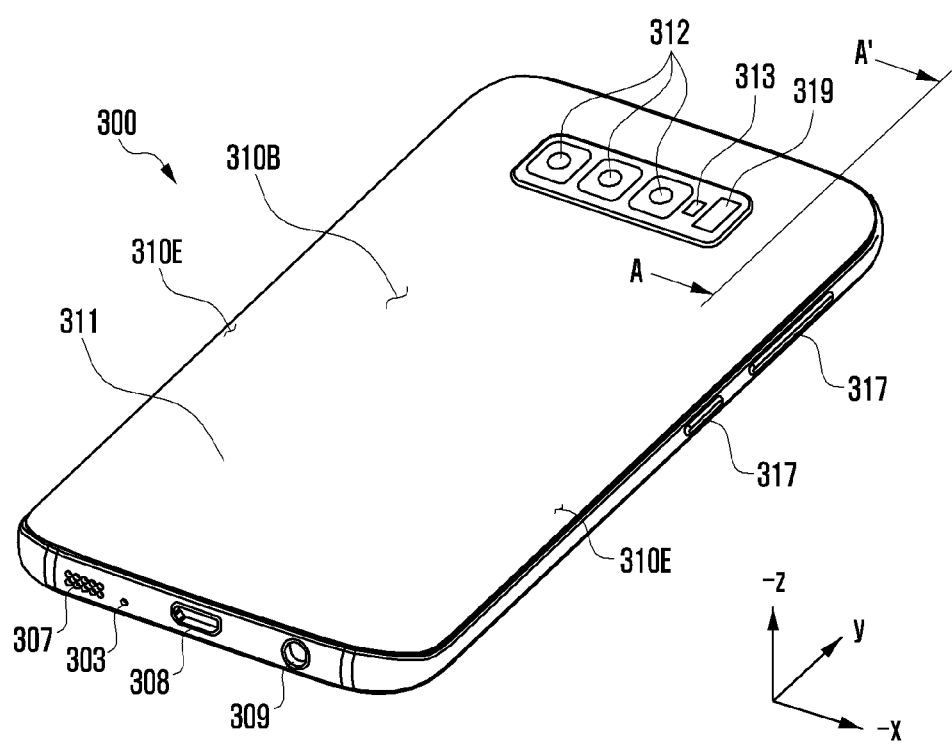
FIG. 3B is a rear perspective view of a mobile electronic device according to various embodiments of the disclosure.

FIG. 3A illustrates a perspective view showing a front surface of a mobile electronic device according to an embodiment of the disclosure, and FIG. 3B illustrates a perspective view showing a rear surface of the mobile electronic device shown in FIG. 3A according to an embodiment of the disclosure.

The electronic device 300 in FIGS. 3A and 3B may be at least partially similar to the electronic device 101 in FIG. 1 or may further include other embodiments.

Referring to FIGS. 3A and 3B, a mobile electronic device 300 may include a housing 310 that includes a first surface (or front surface) 310A, a second surface (or rear surface) 310B, and a lateral surface 310C that surrounds a space between the first surface 310A and the second surface 310B. The housing 310 may refer to a structure that forms a part of the first surface 310A, the second surface 310B, and the lateral surface 310C. The first surface 310A may be formed of a front plate 302 (e.g., a glass plate or polymer plate coated with a variety of coating layers) at least a part of which is substantially transparent. The second surface 310B may be formed of a rear plate 311 which is substantially opaque. The rear plate 311 may be formed of, for example, coated or colored glass, ceramic, polymer, metal (e.g., aluminum, stainless steel (STS), or magnesium), or any combination thereof. The lateral surface 310C may be formed of a lateral bezel structure (or "lateral member") 318 which is combined with the front plate 302 and the rear plate 311 and includes a metal and/or polymer. The rear plate 311 and the lateral bezel structure 318 may be integrally formed and may be of the same material (e.g., a metallic material such as aluminum).

The front plate 302 may include two first regions 310D disposed at long edges thereof, respectively, and bent and extended seamlessly from the first surface 310A toward the rear plate 311. Similarly, the rear plate 311 may include two second regions 310E disposed at long edges thereof, respectively, and bent and extended seamlessly from the second surface 310B toward the front plate 302. The front plate 302 (or the rear plate 311) may include only one of the first regions 310D (or of the second regions 310E). The first regions 310D or the second regions 310E may be omitted in part. When viewed from a lateral side of the mobile electronic device 300, the lateral bezel structure 318 may have a first thickness (or width) on a lateral side where the first region 310D or the second region 310E is not included, and may have a second thickness, being less than the first thickness, on another lateral side where the first region 310D or the second region 310E is included.

The mobile electronic device 300 may include at least one of a display 301, audio modules 303, 307 and 314, sensor modules 304 and 319, camera modules 305, 312 and 313, a key input device 317, a light emitting device, and connector holes 308 and 309. The mobile electronic device 300 may omit at least one (e.g., the key input device 317 or the light emitting device) of the above components, or may further include other components.

The display 301 may be exposed through a substantial portion of the front plate 302, for example. At least a part of the display 301 may be exposed through the front plate 302 that forms the first surface 310A and the first region 310D of the lateral surface 310C. Outlines (i.e., edges and corners) of the display 301 may have substantially the same form as those of the front plate 302. The spacing between the outline of the display 301 and the outline of the front plate 302 may be substantially unchanged in order to enlarge the exposed area of the display 301.

The audio modules 303, 307 and 314 may correspond to a microphone hole 303 and speaker holes 307 and 314, respectively. The microphone hole 303 may contain a microphone disposed therein for acquiring external sounds and, in a case, contain a plurality of microphones to sense a sound direction. The speaker holes 307 and 314 may be classified into an external speaker hole 307 and a call receiver hole 314. The microphone hole 303 and the speaker holes 307 and 314 may be implemented as a single hole, or a speaker (e.g., a piezo speaker) may be provided without the speaker holes 307 and 314.

The sensor modules 304 and 319 may generate electrical signals or data corresponding to an internal operating state of the mobile electronic device 300 or to an external environmental condition. The sensor modules 304 and 319 may include a first sensor module 304 (e.g., a proximity sensor) and/or a second sensor module (e.g., a fingerprint sensor) disposed on the first surface 310A of the housing 310, and/or a third sensor module 319 (e.g., a heart rate monitor (HRM) sensor) and/or a fourth sensor module (e.g., a fingerprint sensor) disposed on the second surface 310B of the housing 310. The fingerprint sensor may be disposed on the second surface 310B as well as the first surface 310A (e.g., the display 301) of the housing 310. The electronic device 300 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 305, 312 and 313 may include a first camera device 305 disposed on the first surface 310A of the electronic device 300, and a second camera module 312 and/or a flash 313 disposed on the second surface 310B. The camera module 305 or the camera module 312 may include one or more lenses, an image sensor, and/or an image signal processor. The flash 313 may include, for example, a light emitting diode or a xenon lamp. Two or more lenses (infrared cameras, wide angle and telephoto lenses) and image sensors may be disposed on one side of the electronic device 300.

The key input device 317 may be disposed on the lateral surface 310C of the housing 310. The mobile electronic device 300 may not include some or all of the key input device 317 described above, and the key input device 317 which is not included may be implemented in another form such as a soft key on the display 301. The key input device 317 may include the sensor module disposed on the second surface 310B of the housing 310.

The light emitting device may be disposed on the first surface 310A of the housing 310. For example, the light emitting device may provide status information of the electronic device 300 in an optical form. The light emitting device may provide a light source associated with the operation of the camera module 305. The light emitting device may include, for example, a light emitting diode (LED), an IR LED, or a xenon lamp.

The connector holes 308 and 309 may include a first connector hole 308 adapted for a connector (e.g., a universal serial bus (USB) connector) for transmitting and receiving power and/or data to and from an external electronic device, and/or a second connector hole 309 adapted for a connector (e.g., an earphone jack) for transmitting and receiving an audio signal to and from an external electronic device.

Some modules 305 of camera modules 305 and 312, some sensor modules 304 of sensor modules 304 and 319, or an indicator may be arranged to be exposed through a display 301. For example, the camera module 305, the sensor module 304, or the indicator may be arranged in the internal space of an electronic device 300 so as to be brought into contact with an external environment through an opening of the display 301, which is perforated up to a front plate 302. In another embodiment, some sensor modules 304 may be arranged to perform their functions without being visually exposed through the front plate 302 in the internal space of the electronic device. For example, in this case, an area of the display 301 facing the sensor module may not require a perforated opening.

Figure 3C:
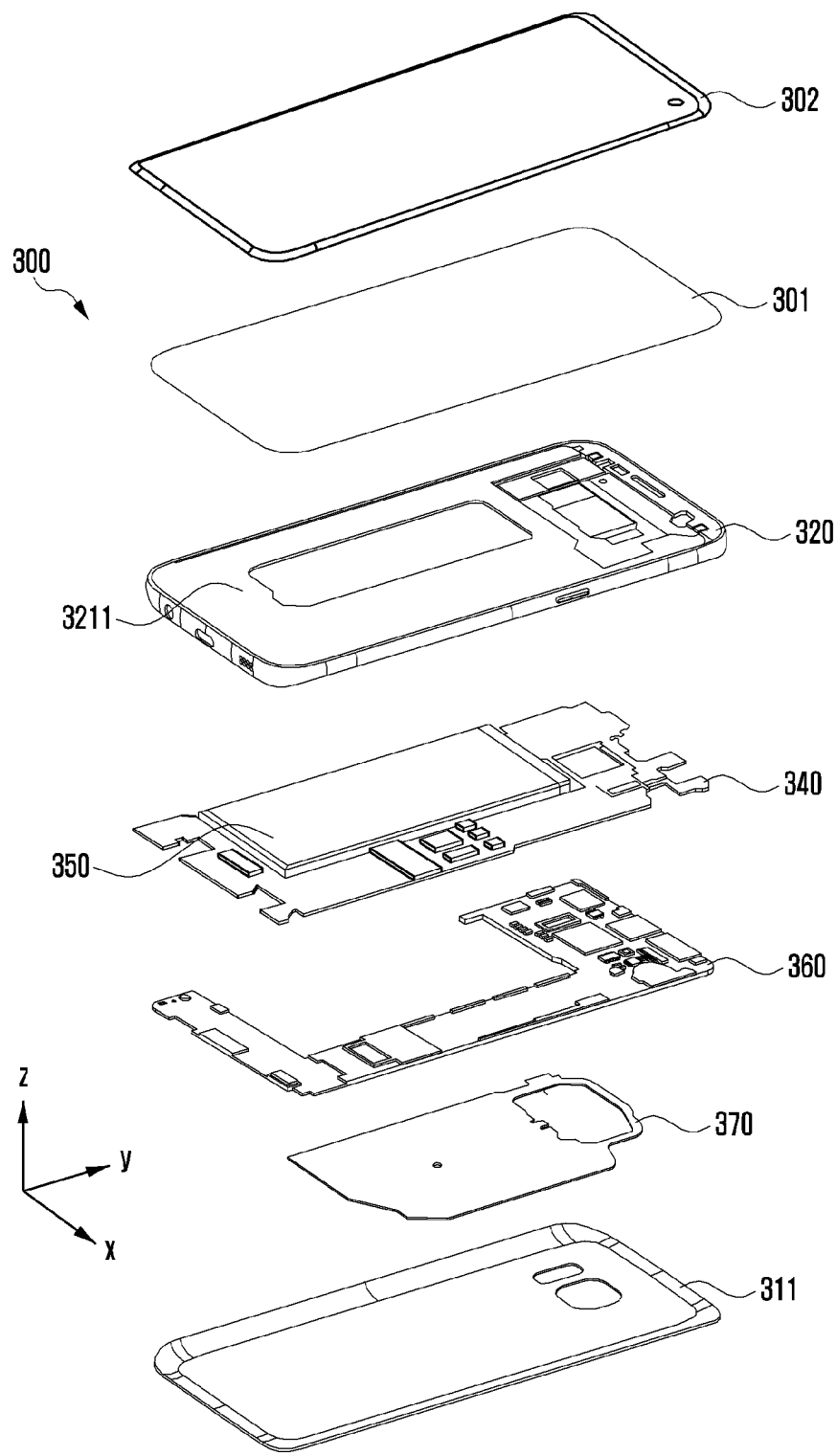
FIG. 3C is an exploded perspective view of a mobile electronic device according to various embodiments of the disclosure.

FIG. 3C illustrates an exploded perspective view showing a mobile electronic device shown in FIG. 3A according to an embodiment of the disclosure.

Referring to FIG. 3C a mobile electronic device 300 may include a lateral bezel structure 320, a first support member 3211 (e.g., a bracket), a front plate 302, a display 301, an electromagnetic induction panel (not shown), a printed circuit board (PCB) 340, a battery 350, a second support member 360 (e.g., a rear case), an antenna 370, and a rear plate 311. The mobile electronic device 300 may omit at least one (e.g., the first support member 3211 or the second support member 360) of the above components or may further include another component. Some components of the electronic device 300 may be the same as or similar to those of the mobile electronic device 101 shown in FIG. 3a or FIG. 3b, thus, descriptions thereof are omitted below.

The first support member 3211 is disposed inside the mobile electronic device 300 and may be connected to, or integrated with, the lateral bezel structure 320. The first support member 3211 may be formed of, for example, a metallic material and/or a non-metal (e.g., polymer) material. The first support member 3211 may be combined with the display 301 at one side thereof and also combined with the printed circuit board (PCB) 340 (e.g., a substrate) at the other side thereof. On the PCB 340, a processor, a memory, and/or an interface may be mounted. The processor may include, for example, one or more of a central processing unit (CPU), an application processor (AP), a graphics processing unit (GPU), an image signal processor (ISP), a sensor hub processor, or a communications processor (CP).

The memory may include, for example, one or more of a volatile memory and a non-volatile memory.

The interface may include, for example, a high definition multimedia interface (HDMI), a USB interface, a secure digital (SD) card interface, and/or an audio interface. The interface may electrically or physically connect the mobile electronic device 300 with an external electronic device and may include a USB connector, an SD card/multimedia card (MMC) connector, or an audio connector.

The battery 350 is a device for supplying power to at least one component of the mobile electronic device 300, and may include, for example, a non-rechargeable primary battery, a rechargeable secondary battery, or a fuel cell. At least a part of the battery 350 may be disposed on substantially the same plane as the PCB 340. The battery 350 may be integrally disposed within the mobile electronic device 300, and may be detachably disposed from the mobile electronic device 300.

The antenna 370 may be disposed between the rear plate 311 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power required for charging wirelessly. An antenna structure may be formed by a part or combination of the lateral bezel structure 320 and/or the first support member 3211.

Figure 4A:
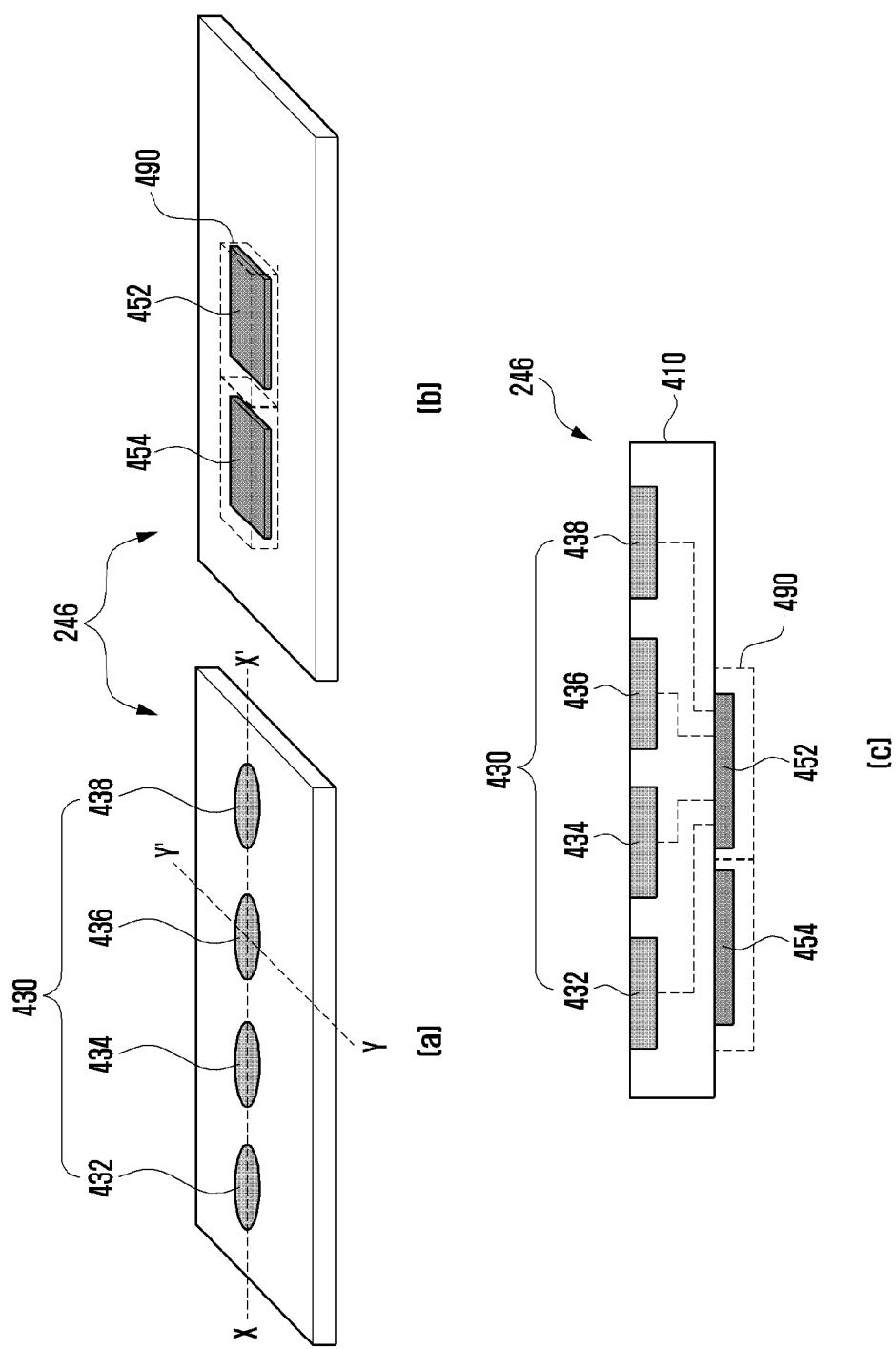
FIG. 4A illustrates an embodiment of a structure of a third antenna module described with reference to FIG. 2 according to various embodiments of the disclosure.

FIG. 4A is a diagram illustrating a structure of, for example, a third antenna module described with reference to FIG. 2 according to an embodiment of the disclosure. FIG. 4A(a) is a perspective view illustrating the third antenna module 246 viewed from one side, and FIG. 4A(b) is a perspective view illustrating the third antenna module 246 viewed from the other side. FIG. 4A(c) is a cross-sectional view illustrating the third antenna module 246 taken along line X-X' of FIG. 4A.

With reference to FIG. 4A, in one embodiment, the third antenna module 246 may include a printed circuit board 410 (e.g., a substrate), an antenna array 430, a RFIC 452, and a PMIC 454. Alternatively, the third antenna module 246 may further include a shield member 490. In other embodiments, at least one of the above-described components may be omitted or at least two of the components may be integrally formed.

The printed circuit board 410 may include a plurality of conductive layers and a plurality of non-conductive layers stacked alternately with the conductive layers. The printed circuit board 410 may provide electrical connections between the printed circuit board 410 and/or various electronic components disposed outside using wirings and conductive vias formed in the conductive layer.

The antenna array 430 (e.g., 248 of FIG. 2) may include a plurality of antenna elements 432, 434, 436, or 438 disposed to form a directional beam. As illustrated, the antenna elements 432, 434, 436, or 438 may be formed at a first surface of the printed circuit board 410. According to another embodiment, the antenna array 430 may be formed inside the printed circuit board 410. According to the embodiment, the antenna array 430 may include the same or a different shape or kind of a plurality of antenna arrays (e.g., dipole antenna array and/or patch antenna array).

The RFIC 452 (e.g., the third RFIC 226 of FIG. 2) may be disposed at another area (e.g., a second surface opposite to the first surface) of the printed circuit board 410 spaced apart from the antenna array. The RFIC 452 is configured to process signals of a selected frequency band transmitted/received through the antenna array 430. According to one embodiment, upon transmission, the RFIC 452 may convert a baseband signal obtained from a communication processor (not shown) to an RF signal of a designated band. Upon reception, the RFIC 452 may convert an RF signal received through the antenna array 430 to a baseband signal and transfer the baseband signal to the communication processor.

According to another embodiment, upon transmission, the RFIC 452 may up-convert an IF signal (e.g., about 9 GHz to about 11 GHz) obtained from an intermediate frequency integrate circuit (IFIC) (e.g., 228 of FIG. 2) to an RF signal of a selected band. Upon reception, the RFIC 452 may down-convert the RF signal obtained through the antenna array 430, convert the RF signal to an IF signal, and transfer the IF signal to the IFIC.

The PMIC 454 may be disposed in another partial area (e.g., the second surface) of the printed circuit board 410 spaced apart from the antenna array 430. The PMIC 454 may receive a voltage from a main PCB (not illustrated) to provide power necessary for various components (e.g., the RFIC 452) on the antenna module.

The shielding member 490 may be disposed at a portion (e.g., the second surface) of the printed circuit board 410 so as to electromagnetically shield at least one of the RFIC 452 or the PMIC 454. According to one embodiment, the shield member 490 may include a shield can.

Although not shown, in various embodiments, the third antenna module 246 may be electrically connected to another printed circuit board (e.g., main circuit board) through a module interface. The module interface may include a connecting member, for example, a coaxial cable connector, board to board connector, interposer, or flexible printed circuit board (FPCB). The RFIC 452 and/or the PMIC 454 of the antenna module may be electrically connected to the printed circuit board through the connection member.

Figure 4B:
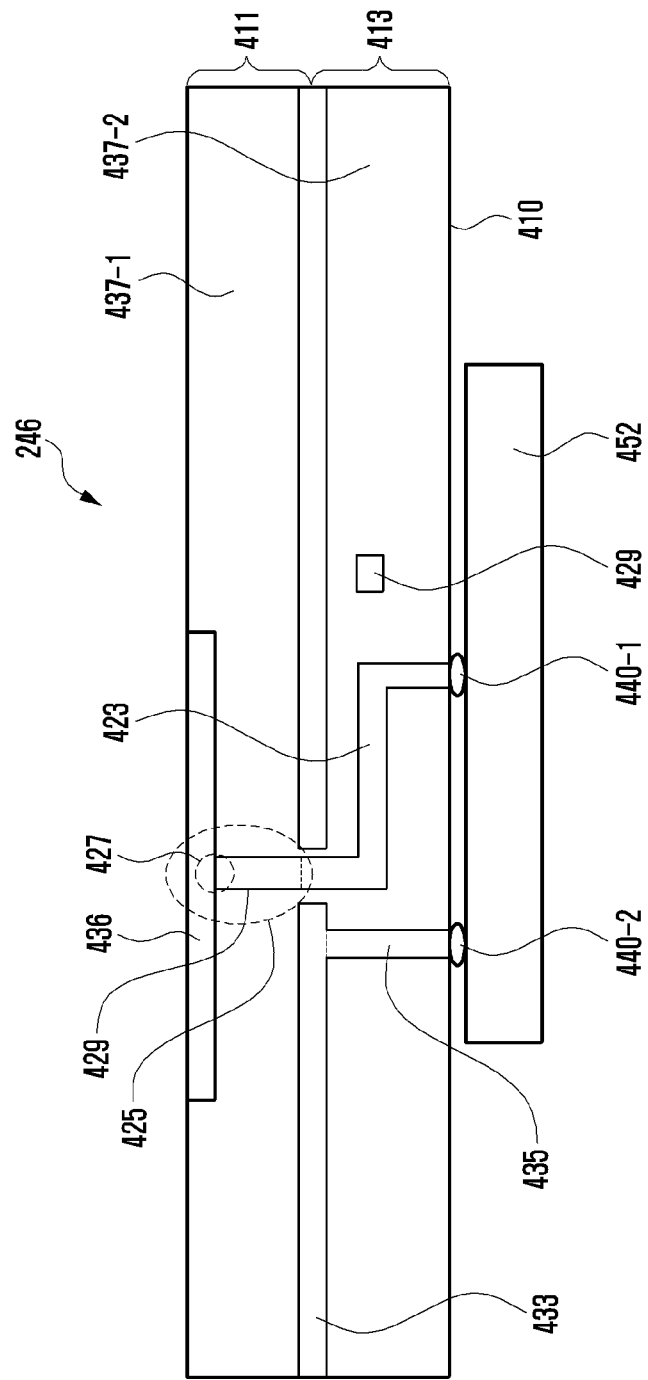
FIG. 4B illustrates a cross-section taken along line Y-Y' of a third antenna module illustrated in (a) of FIG. 4A according to various embodiments of the disclosure.

FIG. 4B is a cross-sectional view illustrating the third antenna module 246 taken along line Y-Y' of FIG. 4A(a) according to an embodiment of the disclosure. The printed circuit board 410 of the illustrated embodiment may include an antenna layer 411 and a network layer 413.

Referring to FIG. 4B, the antenna layer 411 may include at least one dielectric layer 437-1, and an antenna element 436 and/or a power feeding portion 425 formed on or inside an outer surface of a dielectric layer. The power feeding portion 425 may include a power feeding point 427 and/or a power feeding line 429.

The network layer 413 may include at least one dielectric layer 437-2, at least one ground layer 433, at least one conductive via 435, a transmission line 423, and/or a power feeding line 429 formed on or inside an outer surface of the dielectric layer.

Further, in the illustrated embodiment, the RFIC 452 (e.g., the third RFIC 226 of FIG. 2) of FIG. 4A(c) may be electrically connected to the network layer 413 through, for example, first and second solder bumps 440-1 and 440-2. In other embodiments, various connection structures (e.g., solder or ball grid array (BGA)) instead of the solder bumps may be used. The RFIC 452 may be electrically connected to the antenna element 436 through the first solder bump 440-1, the transmission line 423, and the power feeding portion 425. The RFIC 452 may also be electrically connected to the ground layer 433 through the second solder bump 440-2 and the conductive via 435. Although not illustrated, the RFIC 452 may also be electrically connected to the above-described module interface through the power feeding line 429.

Figure 5:
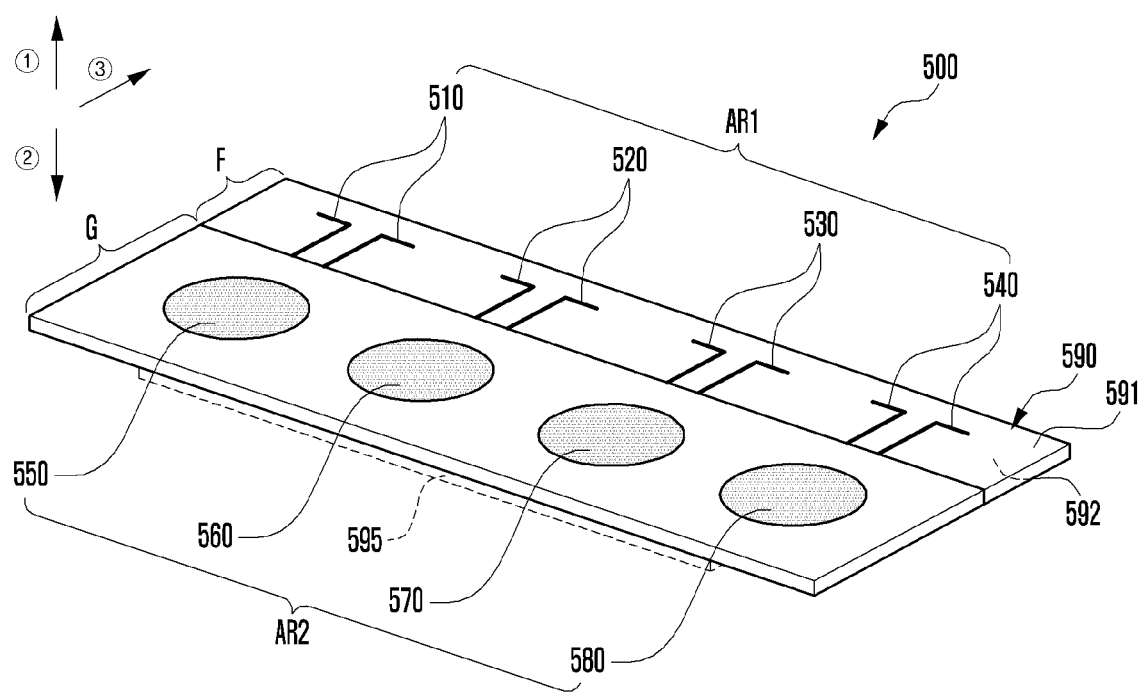
FIG. 5 is a perspective view of an antenna structure according to various embodiments of the disclosure.

FIG. 5 is a perspective view of an antenna structure 500 according to various embodiments of the disclosure.

An antenna module including an antenna structure 500 and a wireless communication circuit 595 of FIG. 5 may be at least partially similar to the third antenna module 246 of FIG. 2, or may further include another embodiment of an antenna module.

Referring to FIG. 5, the antenna structure 500 may include a printed circuit board 590 (e.g., a substrate), a first antenna array AR1 disposed on the printed circuit board 590, and a second antenna array AR2 disposed near the first antenna array AR1. According to one embodiment, the printed circuit board 590 may include a first surface 591 oriented a first direction (direction ①) and a second surface 592 oriented a second direction (direction ②) opposite to the first surface 591. According to one embodiment, the first antenna array AR1 may include multiple conductive patterns 510, 520, 530, and 540 that are arranged with a predetermined interval therebetween in an inner space between the first surface 591 and the second surface 592 of the printed circuit board 590. According to one embodiment, the first antenna array AR1 may be disposed in a fill cut area F including a dielectric layer of the printed circuit board 590. According to one embodiment, the second antenna array AR2 may include multiple conductive patches 550, 560, 570, and 580 which are exposed from the first surface 591 of the printed circuit board 590, or arranged near the first surface 591 in the inner space between the first surface 591 and the second surface 592. According to one embodiment, the second antenna array AR2 may be disposed in a ground area G including a ground layer near the fill cut area F of the printed circuit board 590. According to one embodiment, the multiple conductive patterns 510, 520, 530, and 540 may operate as a dipole antenna. According to one embodiment, the multiple conductive patches 550, 560, 570, and 580 may operate as a patch antenna.

According to various embodiments, the antenna structure 500 may further include a wireless communication circuit 595 mounted on the second surface 592 of the printed circuit board 590 and electrically connected to the first antenna array AR1 and the second antenna array AR2. According to another embodiment, the wireless communication circuit 595 may be disposed in an inner space of an electronic device (e.g., the electronic device 300 of FIG. 3A) spaced apart from the antenna structure 500, and may be electrically connected to the printed circuit board 590 through an electric connection member (e.g., an FPCB connector).

According to various embodiments, in an inner space of an electronic device (e.g., the electronic device 300 of FIG. 3A), the antenna structure 500 may be disposed such that a beam pattern is formed toward a third direction (direction ③) perpendicular to the first direction (direction ①) through the first antenna array AR1. According to one embodiment, the third direction (direction ③) may include a direction in which a side surface (e.g., the side surface 310C of FIG. 3A) of an electronic device (e.g., the electronic device 300 of FIG. 3A) is oriented. According to one embodiment, in an inner space of an electronic device (e.g., the electronic device 300 of FIG. 3A), the antenna structure 500 may be disposed such that a beam pattern is formed in the first direction (direction ①) through the second antenna array AR2. According to one embodiment, the first direction (direction ①) may include a direction in which a rear surface (e.g., the rear surface 310B of FIG. 3B) of an electronic device (e.g., the electronic device 300 of FIG. 3B) is oriented. According to one embodiment, the wireless communication circuit 595 may be configured to transmit/receive a wireless signal in about 3 GHz-100 GHz frequency range through the first antenna array AR1 and/or the second antenna array AR2.

The exemplary embodiment of the disclosure illustrates and describes the antenna structure 500, which includes the first antenna array AR1 including the four multiple conductive patterns 510, 520, 530, and 540, and the second antenna array AR2 including the four multiple conductive patches 550, 560, 570, and 580, the first antenna array AR1 and the second antenna array AR2 are configured to pair with each other but are not limited thereto. For example, the antenna structure 500 may include, as the first antenna array AR1, a single conductive pattern, two conductive patterns, three conductive patterns, or five conductive patterns or more, and may include, as the second antenna array AR2, a single conductive patch, two conductive patches, three conductive patches, or five conductive patches or more, the conductive patterns and the conductive patches are configured to pair with each other, respectively.

Figure 6:
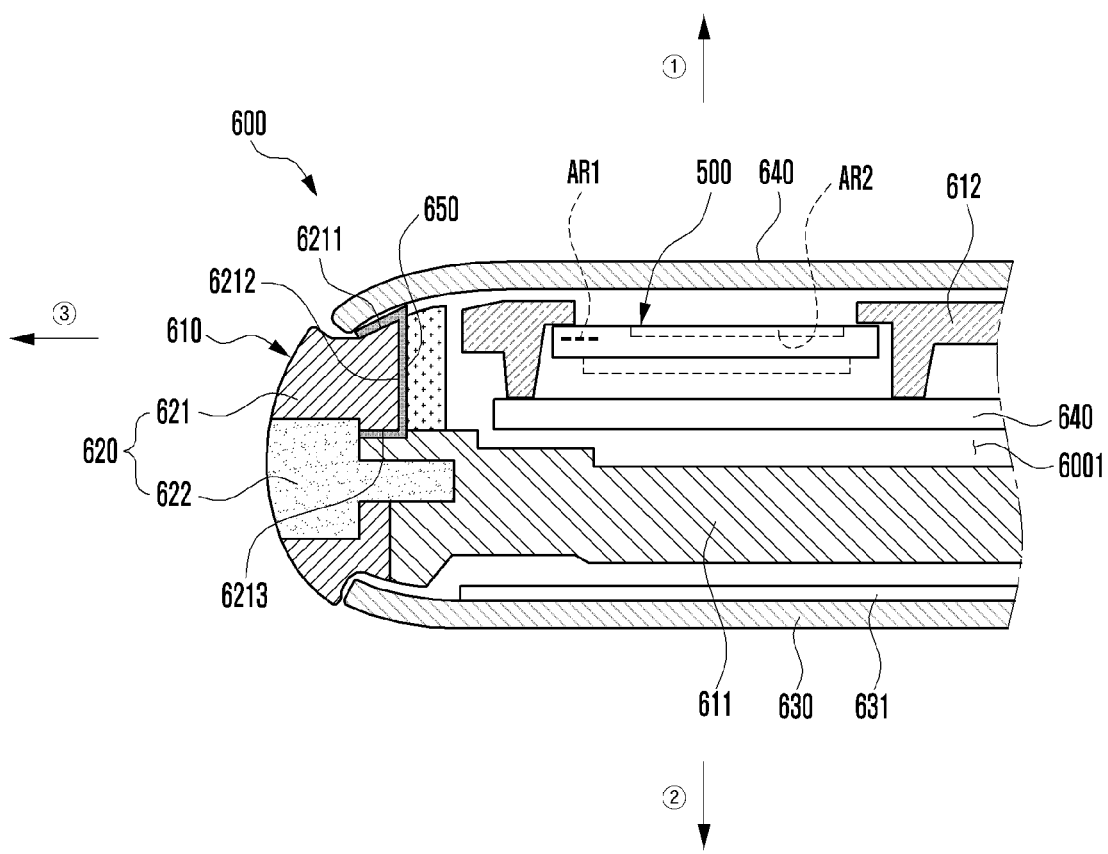
FIG. 6 is a partial sectional view of an electronic device seen from line A-A' of FIG. 3B according to various embodiments of the disclosure.

FIG. 6 is a partial sectional view of an electronic device 600 seen from line A-A' of FIG. 3B according to various embodiments of the disclosure.

An electronic device 600 of FIG. 6 may be at least partially similar to the electronic device 101 of FIG. 1 or the electronic device 300 of FIG. 3A, or may further include another embodiment of an electronic device.

Referring to FIG. 6, the electronic device 600 (e.g., the electronic device 300 of FIG. 3B) may include a housing 610 including a front cover 630 (e.g., a first cover or a first plate) oriented a second direction (direction ②) (e.g., −Z axis direction of FIG. 3B), a rear cover 640 (e.g., a second cover or a second plate) oriented a first direction (direction ①) (e.g., Z axis direction of FIG. 0.3A) opposite to the front cover 630, and a side member 620 configured to surround a space 6001 between the front cover 630 and the rear cover 640. According to one embodiment, the side member 620 may include a conductive portion 621 at least partially disposed in the side member 620 and a polymer portion 622 (e.g., a non-conductive portion) insert-injected into the conductive portion 621. According to another embodiment, the polymer portion 622 may be substituted with a space or another dielectric material. According to another embodiment, the polymer portion 622 may be structurally coupled to the conductive portion 621.

According to various embodiments, the conductive portion 621 may be formed in first and second conductive portions with a pair of predetermined interval spaced non-conductive portions (e.g., a segmentation part) interposed therebetween, and thus may operate as a legacy antenna configured to transmit/receive a wireless signal in about 800 MHz-6000 MHz frequency range through a wireless communication circuit disposed in an electronic device.

According to various embodiments, the side member 620 may include a support member 611 (e.g., the first support structure 3211 of FIG. 3C) extending from the side member 620 to at least a part of the inner space 6001. According to one embodiment, the support member 611 may be configured to extend from the side member 620 toward the inner space 6001, or may be formed by structural coupling with the side member 620. According to one embodiment, the support member 611 may be configured to extend from the conductive portion 621. According to one embodiment, the support member 611 may include a polymer member and/or a conductive member into which a polymer member is at least partially insert-injected. According to one embodiment, the support member 611 may be configured to support at least a part of a device substrate 640 (e.g., a main board) and/or a display 631 which are disposed in the inner space 6001. According to another embodiment, the support member 611 may be disposed to support at least a part of a battery (e.g., the battery 350 of FIG. 3C) disposed in the inner space. According to one embodiment, the display 631 may be disposed to be seen from the outside through at least a part of the front cover 630.

According to various embodiments, the printed circuit board 590 of the antenna structure 500 may be disposed in a direction parallel to the rear cover 640 in the inner space 6001 of the electronic device 600. In this case, the antenna structure 500 may be supported through at least one antenna support member 612 disposed in the inner space 6001 of the electronic device 600. According to one embodiment, the at least one antenna support member 612 may be formed of a polymer material. According to one embodiment, in the printed circuit board 590, multiple conductive patterns (e.g., the multiple conductive patterns 510, 520, 530, and 540 of FIG. 5) of a first antenna array AR1 may be arranged such that a beam pattern is formed in a third direction (direction ③) which is perpendicular to a first direction (direction ①) and in which the side member 620 is oriented. According to one embodiment, in the printed circuit board 590, multiple conductive patches (e.g., the multiple conductive patches 550, 560, 570, and 580 of FIG. 5) of a second antenna array AR2 may be arranged such that a beam pattern is formed in a first direction (direction ①) in which the rear cover 640 is oriented.

According to various embodiments, at least a part of the conductive portion 621 of the electronic device 600 may be disposed at a position overlapping the direction (direction ③) in which a beam pattern of the first antenna array AR1 is oriented. Therefore, the beam pattern formed by the first antenna array AR1 of the antenna structure 500 may be changed to and/or distorted in an unintended direction other than the third direction (direction ③) by the conductive portion 621.

The electronic device 600 according to an exemplary embodiment of the disclosure may include at least one radio-wave absorption member 650 disposed between the antenna structure 500 and the conductive portion 621 in the inner space 6001 of the electronic device. According to one embodiment, the radio-wave absorption member 650 may include a ferrite sheet. According to one embodiment, in between the antenna structure 500 and the conductive portion 621, the radio-wave absorption member 650 may be disposed to surround an area corresponding to the conductive portion 621 oriented towards the antenna structure 500. According to one embodiment, the radio-wave absorption member 650 may be disposed in a path in which a beam pattern formed by the first antenna array AR1 is oriented. According to one embodiment, when the side member is seen from the outside, the radio-wave absorption member 650, in an area corresponding to the conductive portion 621 oriented toward the antenna structure 500, may be disposed at a position overlapping the antenna structure. According another embodiment, when the side member is seen from the outside, the radio-wave absorption member 650 may be disposed such that the beam pattern is oriented towards the side member at a portion near the antenna structure even though not overlapping the antenna structure 500. According to one embodiment, in the inner space 6001 of the electronic device 600, the radio-wave absorption member 650 may be disposed in the form of surrounding not only a side surface 6212 oriented towards the first antenna array AR1 of the conductive portion 621 but also an upper surface 6211 extending from the side surface 6212 in the first direction (direction ①) and a lower surface 6213 extending in the second direction (direction ②). For example, if the conductive portion has a relatively thin thickness, not only the upper surface 6211 but also the lower surface 6213 of the conductive portion 621 should be surrounded by the radio-wave absorption member 650 so that the performance improvement thereof can be significant.

According to various embodiments, the radio-wave absorption member 650 may include a thin film sheet formed of a mixture of a metal powder and a silicon-based dispersant. According to one embodiment, the radio-wave absorption member 650 may be attached to the conductive portion 621 through a double-sided tape in the inner space 6001 of the electronic device 600. Accordingly, it can be prevented that the radio-wave (e.g., radiation components) radiated from the first antenna array AR1 is induced into the conductive portion 621 through the radio-wave absorption member 650. In addition, the radio-wave radiated therefrom is at least partially absorbed into the radio-wave absorption member 650 and thus a reflection signal is reduced as well. Therefore, the deformation and/or distortion of radiation components radiated from the first antenna array AR1, which is caused by the conductive portion 321, can be prevented to contribute to the radiation performance improvement of an antenna.

Figure 7:
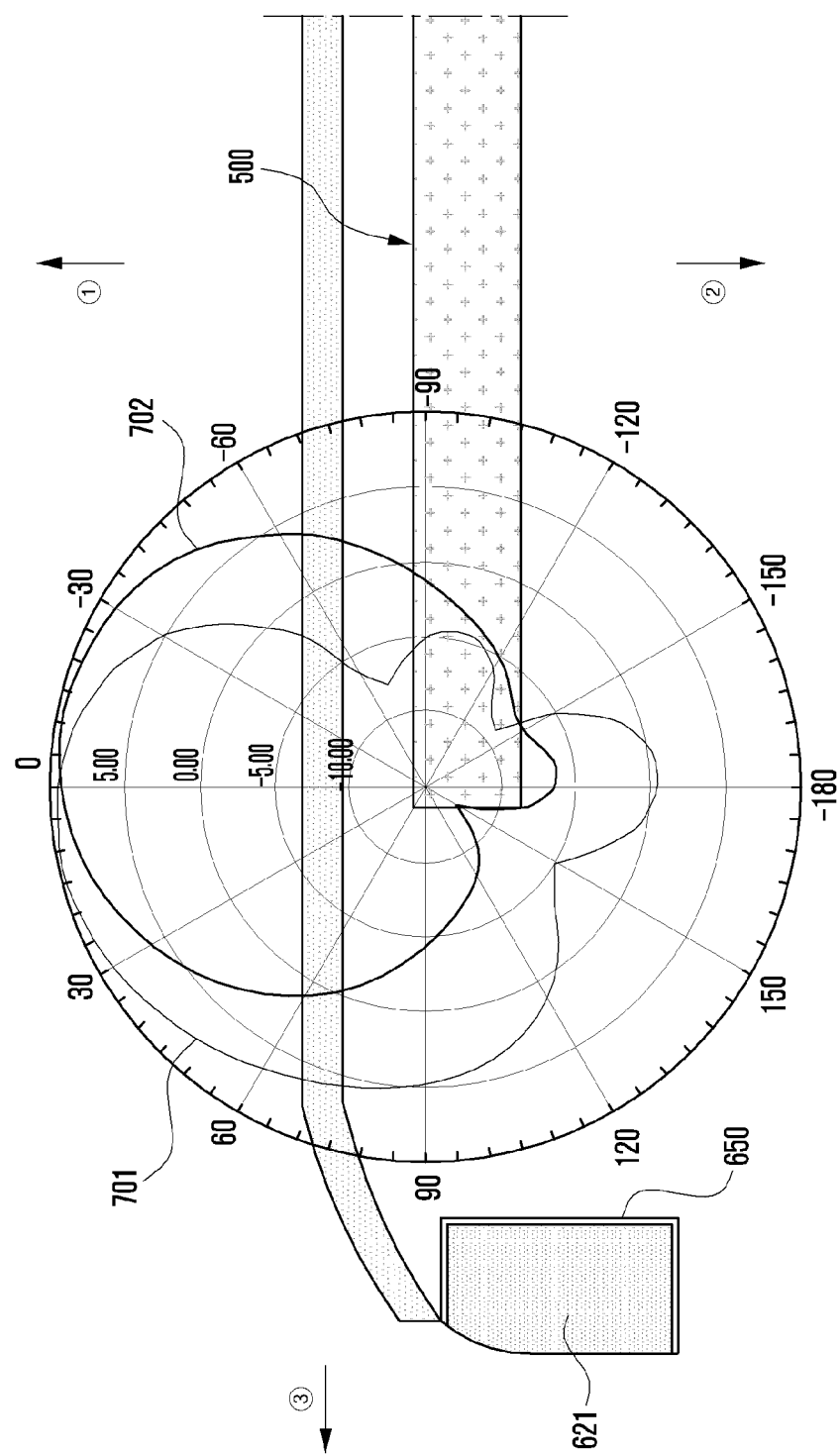
FIG. 7 is a comparison view of radiation patterns of an antenna structure according to existence and non-existence of a radio-wave absorption member according to various embodiments of the disclosure.

FIG. 7 is a comparison view of radiation patterns of an antenna structure 500 according to existence and non-existence of a radio-wave absorption member according to various embodiments of the disclosure.

Referring to FIG. 7, there is a considerable improvement in that the radiation direction of radiation patterns 701 of the antenna structure 500 in embodiments including the radio-wave absorption member 650 oriented in the third direction (direction ③) (e.g., the direction in which the side member 620 is oriented) more than the radiation direction of radiation patterns 702 of the antenna structure 500 in embodiments not including the radio-wave absorption member 650.

Figure 8:
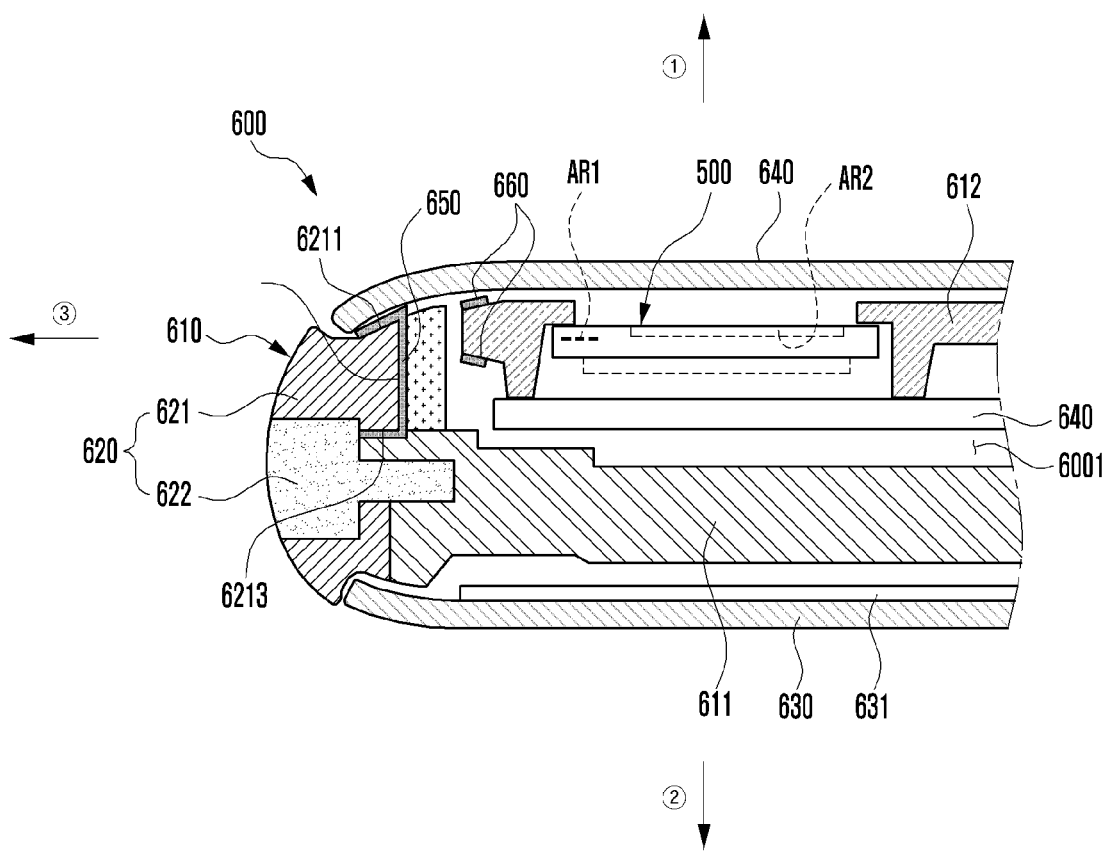
FIG. 8 is a partial sectional view of an electronic device including a radio-wave induction member according to various embodiments of the disclosure.

FIG. 8 is a partial sectional view of an electronic device 600 including a radio-wave induction member 660 according to various embodiments of the disclosure.

In connection with the description of FIG. 8, same reference numerals have been used to refer to elements substantially identical to elements of FIG. 6, and the detailed description thereof may be omitted for convenience of explanation.

Referring to FIG. 8, an electronic device 600 may include at least one radio-wave induction member 660 disposed between a radio-wave absorption member 650 and an antenna structure 500. According to one embodiment, the radio-wave induction member 660 may be disposed between a conductive portion 621 and the antenna structure 500 in an inner space 6001 of the electronic device 600. According to one embodiment, the radio-wave induction member 660 may be disposed between the radio-wave absorption member 650 and the antenna structure 500 in the inner space 6001 of the electronic device 600. According to one embodiment, the radio-wave induction member 660 may include at least one director disposed near the antenna structure 500 in the inner space 6001 of the electronic device 600. According to one embodiment, the radio-wave induction member 660 may include at least one conductor disposed on an antenna support member 612, in between the radio-wave absorption member 650 and the antenna structure 500 in the inner space 6001 of the electronic device 600. According to one embodiment, the radio-wave induction member 660 may include multiple conductors arranged at a position corresponding to multiple conductive patterns (e.g., the multiple conductive patterns 510, 520, 530, and 540 of FIG. 5) of the antenna structure 500.

The antenna structure 500 according to an exemplary embodiment of the disclosure can absorb a radio-wave through the radio-wave absorption member 650 and simultaneously reduce a reflection signal caused by the conductive portion 621, and enables a radio-wave to be induced in a third direction (direction ③) through the radio-wave induction member 660, thereby contributing to a radiation pattern formation in the side direction.

Figure 9:
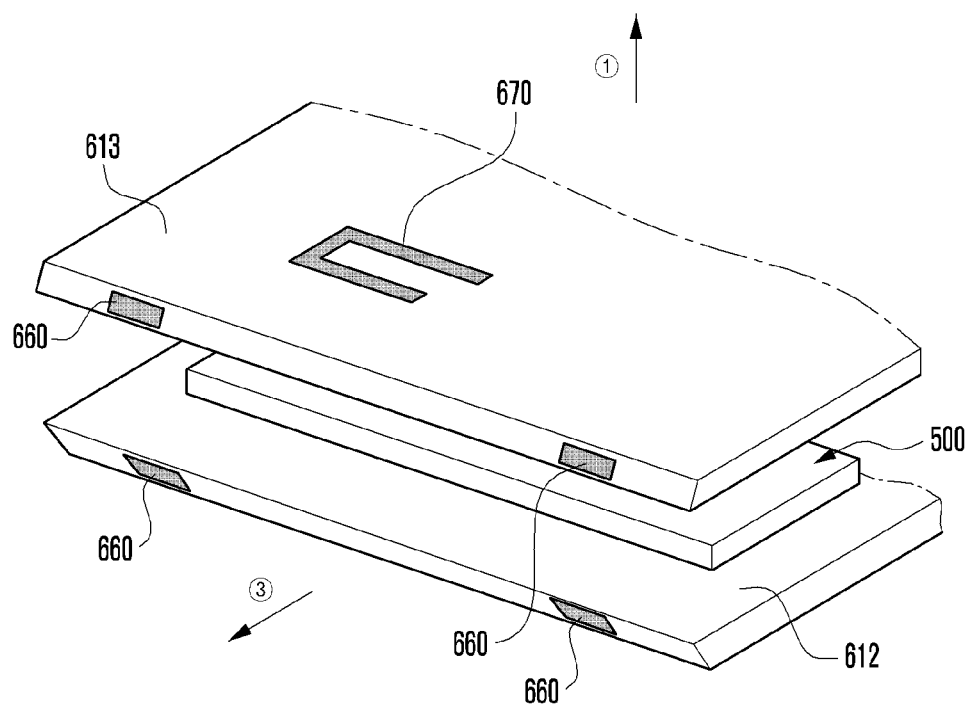
FIG. 9 is a partial perspective view showing an arrangement structure of a radio-wave induction member inside an electronic device according to various embodiments of the disclosure.

FIG. 9 is a partial perspective view showing an arrangement structure of a radio-wave induction member 660 inside an electronic device according to various embodiments of the disclosure.

Referring to FIG. 9, radio-wave induction members 660, with an antenna structure 500 interposed therebetween, not only may be disposed on an antenna support member 612 but also may be disposed on a rear bracket 613 disposed near a rear cover (e.g., the rear cover 640 of FIG. 8). According to one embodiment, the radio-wave induction members 660 may be arranged in opposite to each other at positions in which the antenna support member 612 and the rear bracket 613 correspond to each other. According to another embodiment, the radio-wave induction members 660 may be arranged not opposite to each other at positions in which the antenna support member 612 and the rear bracket 613 do not correspond to each other.

According to various embodiments, the rear bracket 613 may include at least one second conductive pattern 670 which operates through another wireless communication circuit (e.g., the wireless communication module 192 of FIG. 1) disposed in an inner space (e.g., the inner space 6001 of FIG. 8) of an electronic device (e.g., the electronic device 600 of FIG. 8). According to one embodiment, the at least one second conductive pattern 670 may be formed in the rear bracket 613 made of an injection product material in a laser direct structuring (LDS) type. According to another embodiment, the at least one second conductive pattern 670 may include a plate-typed conductive pattern additionally attached to the rear bracket 613. According to another embodiment, the at least one second conductive pattern 670 may insert-injected in an inner space of the rear bracket 613. According to another embodiment, the rear bracket 613 may include an antenna carrier for receiving the at least one second conductive pattern 670. According to one embodiment, another wireless communication circuit (e.g., the wireless communication module 192 of FIG. 1) may be configured to transmit/receive a wireless signal in 800 MHz-6000 MHz frequency range (a legacy band) through the at least one second conductive pattern 670.

Figure 10:
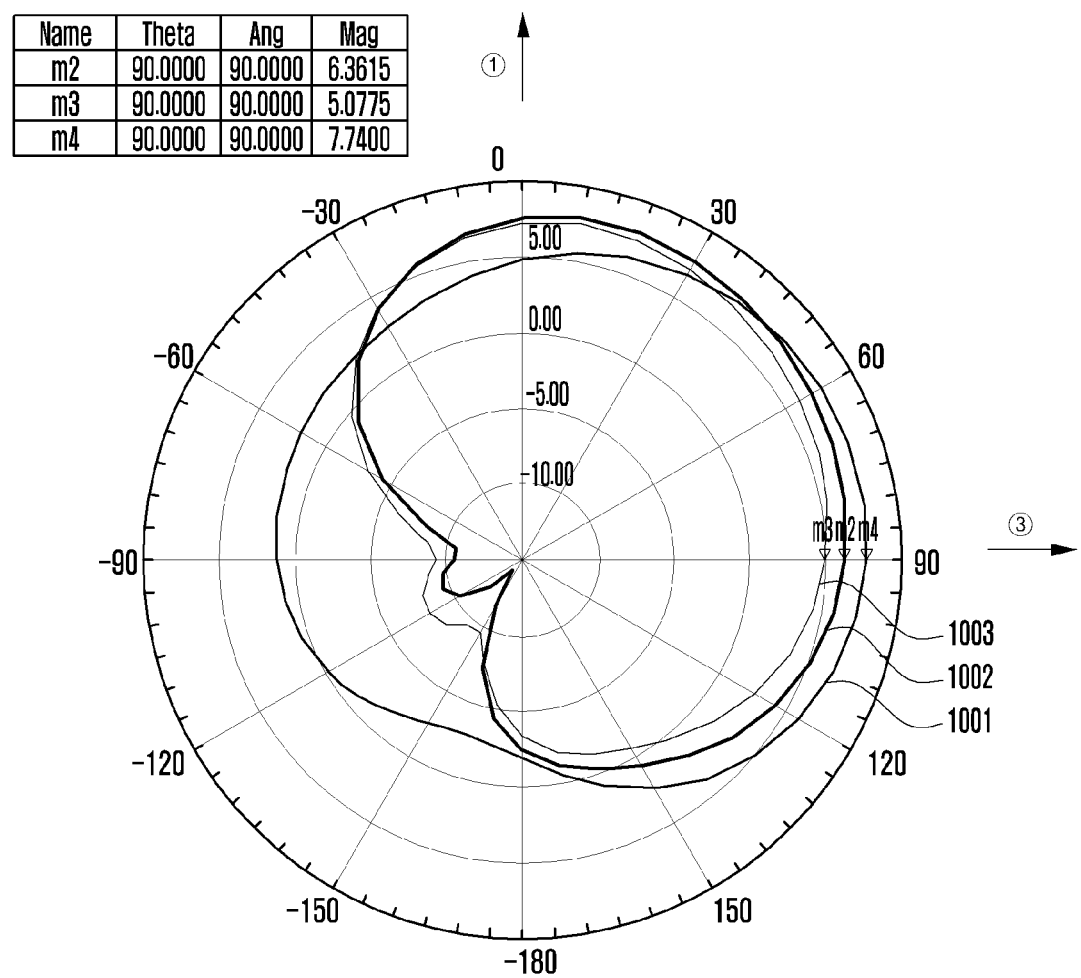
FIG. 10 is a comparison view of radiation patterns of an antenna structure according to existence and non-existence of a radio-wave induction member according to various embodiments of the disclosure.

FIG. 10 is a comparison view of radiation patterns of an antenna structure according to existence and non-existence of a radio-wave induction member 560 according to various embodiments of the disclosure.

Referring to FIG. 10, when only a radio-wave absorption member (e.g., the radio-wave absorption member 650 of FIG. 8) is applied in a main radiation direction (e.g., in direction ③), an antenna structure (e.g., the antenna structure 500 of FIG. 8) has 5.07 dB of an expressed gain (the radiation pattern 1003). However, when a radio-wave induction member (e.g., the radio-wave induction member 660 of FIG. 8) is added, the gain thereof increases to 6.3 dB (the radiation pattern 1002), and thus it may be known that the gain is closer to 7.74 dB of the best gain (the radiation pattern 1001) measured before the antenna structure 500 is mounted to an electronic device (e.g., the electronic 600 of FIG. 8). It may mean that it may further contribute to a radiation performance improvement when both the radio-wave absorption member 650 and the radio-wave induction member 660 are applied to the electronic device 600.

According to various embodiments, an electronic device (e.g., the electronic device 600 of FIG. 6) may include a housing (e.g., the housing 610 of FIG. 6) including a front cover, a rear cover (e.g., the rear cover 640 of FIG. 6) oriented in a direction opposite to the front cover (e.g., the front cover 630 of FIG. 6), and a side member (e.g., the side member 620 of FIG. 6) configured to surround a space (e.g., the inner space 6001 of FIG. 6) between the front cover and the rear cover and at least partially includes a conductive portion (e.g., the conductive portion 621 of FIG. 6), an antenna structure (e.g., the antenna structure 500 of FIG. 6) disposed in the space, the antenna structure including a substrate (e.g., the printed circuit board 590 of FIG. 5) which includes a first surface (e.g., the first surface 591 of FIG. 5) and a second surface (e.g., the second surface 592 of FIG. 5) oriented in a direction opposite to the first surface, and at least one first antenna element (e.g., the at least one first antenna array AR1 of FIG. 6) which is disposed in the space between the first surface and the second surface and configured to form a beam pattern toward a conductive portion, and a radio-wave absorption member (e.g., the a radio-wave absorption member 650 of FIG. 6) disposed in a path in which the beam pattern is formed, between the conductive portion and the at least one first antenna element, and a first wireless communication circuit (e.g., the first wireless communication circuit 595 of FIG. 5) disposed in the space and configured to transmit and/or receive a wireless signal in a first frequency band through the at least one first antenna element.

According to various embodiments, the first wireless communication circuit may be configured to transmit and/or receive a wireless signal having frequency in the range of 3 GHz-100 GHz through the at least one first antenna element.

According to various embodiments, the radio-wave absorption member may be disposed to surround an area of the conductive portion, the area oriented towards the antenna structure.

According to various embodiments, the radio-wave absorption member may include at least one of a ferrite sheet or a thin film sheet formed of a mixture of a metal powder and a silicon-based dispersant.

According to various embodiments, at least one radio-wave induction member (e.g., the radio-wave induction member 660 of FIG. 8) disposed between the radio-wave absorption member and the at least one antenna element may be included.

According to various embodiments, the radio-wave induction member has an arrangement angle to avoid the conductive member.

According to various embodiments, the radio-wave induction member may include at least one director formed of at least one conductor disposed near the antenna structure.

According to various embodiments, at least one support member (e.g., the antenna support member 612) disposed near the antenna structure, in the space, may be further included, wherein the radio-wave induction member may be disposed on the at least one support member.

According to various embodiments, the at least one support member may include an antenna support member made of a polymer material, which supports the substrate of the antenna structure.

According to various embodiments, the at least one support member may include at least one polymer bracket (e.g., the rear bracket 613 of FIG. 9) disposed in the space.

According to various embodiments, the at least one polymer bracket further may include at least one conductive pattern (e.g., the conductive pattern 670 of FIG. 9).

According to various embodiments, a second wireless communication circuit (e.g., the wireless communication module 192 of FIG. 1) disposed in the space may be further included, wherein the second wireless communication circuit may be configured to transmit and/or receive a wireless signal in a second frequency band through the at least one conductive pattern.

According to various embodiments, the second wireless communication circuit may be configured to transmit and/or receive a wireless signal in about 800 MHz-6000 MHz frequency band through the at least one conductive pattern.

According to various embodiments, the at least one conductive pattern may be formed on the polymer bracket in a laser direct structuring (LDS) type.

According to various embodiments, the at least one first antenna element may include a dipole antenna radiator including at least one conductive pattern.

According to various embodiments, at least one second antenna element (e.g., the second antenna array AR2 of FIG. 6) disposed near the at least one first antenna element may be further included.

According to various embodiments, the first wireless communication circuit may be configured to form a beam pattern in a direction perpendicular to the beam pattern direction formed by the first antenna element in the first frequency band through the at least one second antenna element.

According to various embodiments, the second antenna element may be configured to form a beam pattern in a direction in which the rear cover is oriented.

According to various embodiments, the at least one second antenna element may include at least one conductive patch which is configured to be exposed from the first surface of the substrate, or is arranged near the first surface in the space between the first surface and the second surface.

According to various embodiments, a display (e.g., the display 631 of FIG. 6), in the space, disposed to be visible from the outside through at least a part of the front cover may be further included.

Embodiments of the disclosure disclosed in the specification and the drawings are merely specific examples presented to easily describe the technical content according to embodiments of the disclosure and to help understanding of the disclosure, and are not intended to limit the scope of embodiments of the disclosure. Accordingly, the scope of various embodiments of the disclosure is to be interpreted to include not only embodiments disclosed herein, but also all changed or modified forms derived based on the technical idea of various embodiments of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
    a housing having an inner space;
    an antenna structure disposed in the inner space of the housing, the antenna structure comprising:
        a substrate comprising:
            a first surface, and
            a second surface oriented in a direction opposite to the first surface; and
        at least one first antenna element disposed in a space between the first surface and the second surface and configured to form a beam pattern toward a conductive portion of the housing;
    a radio-wave absorption member disposed between the conductive portion and the at least one first antenna element in a path in which the beam pattern is formed;
    at least one radio-wave induction member disposed between the radio-wave absorption member and the at least one first antenna element; and
    a first wireless communication circuit disposed in the inner space and configured to transmit or receive a wireless signal in a first frequency band through the at least one first antenna element.

2. The electronic device of claim 1, wherein the first wireless communication circuit is configured to transmit and receive a wireless signal having a frequency in a range from 3 GHz to 100 GHz through the at least one first antenna element.

3. The electronic device of claim 1, wherein the radio-wave absorption member is disposed to surround an area of the conductive portion oriented towards the antenna structure.

4. The electronic device of claim 1, wherein the radio-wave absorption member comprises at least one of a ferrite sheet or a thin film sheet formed of a mixture of a metal powder and a silicon-based dispersant.

5. The electronic device of claim 1, wherein the radio-wave induction member has an arrangement angle to avoid the conductive portion.

6. The electronic device of claim 1, wherein the radio-wave induction member comprises at least one director formed of at least one conductor disposed near the antenna structure.

7. The electronic device of claim 1, further comprising, in the inner space of the housing, at least one support member disposed near the antenna structure,
wherein the radio-wave induction member is disposed on the at least one support member.

8. The electronic device of claim 7, wherein the at least one support member comprises an antenna support member made of a polymer material, which supports the substrate of the antenna structure.

9. The electronic device of claim 7, wherein the at least one support member comprises at least one polymer bracket disposed in the inner space of the housing.

10. The electronic device of claim 9, wherein the at least one polymer bracket further comprises at least one conductive pattern.

11. The electronic device of claim 10, further comprising a second wireless communication circuit disposed in the inner space of the housing,
wherein the second wireless communication circuit is configured to transmit and receive a wireless signal in a second frequency band through the at least one conductive pattern.

12. The electronic device of claim 11, wherein the second wireless communication circuit is configured to transmit and receive a wireless signal in 800 MHz-6000 MHz frequency band through the at least one conductive pattern.

13. The electronic device of claim 10, wherein the at least one conductive pattern is formed on the at least one polymer bracket in a laser direct structuring (LDS) S) type.

14. The electronic device of claim 1, wherein the at least one first antenna element comprises a dipole antenna radiator comprising at least one conductive pattern.

15. The electronic device of claim 1, further comprising:
at least one second antenna element disposed near the at least one first antenna element.

16. The electronic device of claim 15, wherein the first wireless communication circuit is configured to form a beam pattern in a direction perpendicular to a direction of the beam pattern formed by the at least one first antenna element in the first frequency band through the at least one second antenna element.

17. The electronic device of claim 15, wherein the at least one second antenna element is configured to form a beam pattern in a direction in which a rear cover is oriented.

18. The electronic device of claim 15, wherein the at least one second antenna element includes at least one conductive patch exposed from the first surface of the substrate or arranged near the first surface in the space between the first surface and the second surface.

19. The electronic device of claim 1, further comprising:
a display in the inner space of the housing and disposed to be visible from an outside of the housing through at least a part of a front cover.

* * * * *